US007270089B2

(12) United States Patent
Wong

(10) Patent No.: US 7,270,089 B2
(45) Date of Patent: Sep. 18, 2007

(54) METHOD AND APPARATUS FOR CONTROLLING TRANSITION BETWEEN OPERATING MODES IN A MULTIMODE ENGINE

(75) Inventor: Hoi Ching Wong, San Diego, CA (US)

(73) Assignee: Clean Air Power, Inc., San Diego, CA (US)

( * ) Notice: Subject to any disclaimer, the term of this patent is extended or adjusted under 35 U.S.C. 154(b) by 49 days.

(21) Appl. No.: 10/552,894

(22) PCT Filed: Jun. 10, 2004

(86) PCT No.: PCT/US2004/018539

§ 371 (c)(1),
(2), (4) Date: Oct. 12, 2005

(87) PCT Pub. No.: WO2004/113705

PCT Pub. Date: Dec. 29, 2004

(65) Prior Publication Data
US 2007/0000456 A1 Jan. 4, 2007

(30) Foreign Application Priority Data
Jun. 11, 2003 (GB) ................................. 0313466.5

(51) Int. Cl.
F02D 19/00 (2006.01)
F02B 7/00 (2006.01)
F02M 21/00 (2006.01)
(52) U.S. Cl. ................... 123/27 GE; 123/526; 123/431
(58) Field of Classification Search ................ 123/295, 123/304, 305, 431, 436, 525, 27 GE, 575, 123/526

See application file for complete search history.

(56) References Cited

U.S. PATENT DOCUMENTS

| 4,909,209 | A | 3/1990 | Takahasi |
| 5,937,800 | A | 8/1999 | Ginzel et al. |
| 6,055,963 | A | 5/2000 | Brown et al. |
| 6,101,986 | A | 8/2000 | Brown et al. |
| 6,516,774 | B2* | 2/2003 | zur Loye et al. ........... 123/299 |
| 6,543,385 | B2 | 4/2003 | Raymond et al. |

(Continued)

FOREIGN PATENT DOCUMENTS

DE          1014063         4/2003

(Continued)

*Primary Examiner*—Hai Huynh
(74) *Attorney, Agent, or Firm*—Boyle Fredrickson S.C.

(57) ABSTRACT

At least one engine operating parameter other than total fuel energy content is taken into account when transitioning between operating modes in a dual fuel or other multimode engine (20) in order to maintain a smooth transition between modes. The parameter preferably comprises at least one of primary fuel excess air ratio (lambda) and ignition timing and preferably is controlled in addition to total fuel energy content control. Lambda control is especially beneficial because it permits the control system to compensate for the engine's inability to substantially alter the instantaneous air mass in the combustion chamber during the transition period. For instance, during a transition from pilot ignited gaseous fuel mode to diesel mode, the controlled parameter preferably comprises diesel lambda, and the controlling step comprises setting diesel lambda at a relatively high value at the beginning of the transition period and thereafter reducing diesel lambda during the transition period.

31 Claims, 4 Drawing Sheets

U.S. PATENT DOCUMENTS 6,561,157 B2 * 5/2003 zur Loye et al. ............ 123/295
6,684,849 B2 * 2/2004 zur Loye et al. ............ 123/295
6,907,870 B2 * 6/2005 zur Loye et al. ............ 123/594
7,044,103 B2 * 5/2006 May ............................ 123/299
7,093,588 B2 * 8/2006 Edwards ..................... 123/525
2002/0007816 A1 1/2002 Zur Loye et al.

FOREIGN PATENT DOCUMENTS

DE 10239397 A 3/2004
EP 1255033 A2 11/2002
WO WO 02077427 A 10/2002

* cited by examiner

METHOD AND APPARATUS FOR CONTROLLING TRANSITION BETWEEN OPERATING MODES IN A MULTIMODE ENGINE

BACKGROUND OF THE INVENTION

1. Field of the Invention

This invention relates generally to multimode engines capable of operating in multiple fueling modes, and, more particularly, relates to a method and apparatus for transitioning between fueling modes in such an engine so as to reduce engine speed fluctuations and/or other undesired responses to such transitions.

2. Discussion of the Related Art

So-called "multimode" engines are capable of operating in multiple fueling modes in that they are powered by different fuels or combinations of fuels depending, e.g., on the prevailing engine speed and load conditions. For example, a dual fuel engine can typically operate in two modes, namely, a "diesel mode" and a "pilot ignited gaseous fuel mode." In the diesel mode, the engine is fueled solely by a liquid fuel, typically diesel fuel. In the pilot ignited gaseous fuel mode, the engine is fueled primarily by a gaseous fuel, such as natural gas or propane, which is ignited by a relatively small quantity or "pilot" charge of a liquid fuel, typically diesel fuel or engine lube oil.

Depending upon the particular engine utilized, there are typically at least two transition points within the operating range of a dual fuel engine. Specifically, the typical engine is operated in pilot ignited gaseous fuel mode except at the condition that the excess air ratio (lambda) does not permit, such as, (1) very light load under all engine speeds and, (2) at high load, low speed conditions. The transition historically was triggered and controlled based solely as a function of speed and/or load without attempting to achieve a smooth transition. This relatively uncontrolled transition could lead to undesired speed fluctuations. For example, in a prior art dual fuel system, as the vehicle is driving up a hill while operating in pilot ignited gaseous fuel mode, the vehicle's engine speed may lug down sufficiently to trigger a changeover to diesel mode. An uncontrolled rapid switchover to diesel may cause a power surge and a resultant increase in vehicle speed back above the pilot ignited gaseous fuel transition speed for the prevailing load, whereupon the engine switches back to pilot ignited gaseous fuel mode and experiences a power drop. As a result, the vehicle speed may again drop below the transition speed with a resultant switchover to diesel mode. Hence, the engine may switch frequently and repeatedly between operating modes, resulting in noticeable speed surges and droops.

Some prior systems have recognized the problem identified above and have attempted to address it by taking the total energy content of the fuel(s) into account during the transition in an attempt avoid power surges and droops. For instance, U.S. Pat. No. 6,101,986 to Brown (the Brown patent) controls the delivery of diesel and gaseous fuel to the engine during transition between the pilot ignited gaseous fuel mode and the diesel mode to maintain the energy content of combined fuel charge at the desired value of the diesel fuel charge supplied at the end of the transition period. As a result, the quantity of diesel fuel progressively increases during the transition period, while the quantity of gaseous fuel progressively decreases. The process is repeated in a cycle-by-cycle basis until the actual diesel fuel quantity equals the desired quantity for diesel only operation, at which point the transition is considered complete.

U.S. Published Patent Application Serial No. 2002/07816 to Zur Loye similarly discloses a method for controlling a homogenous charge dual fuel engine to switch between diesel only mode and pilot ignited gaseous fuel mode while keeping the total fuel energy content constant.

A problem associated with prior techniques for controlling the transition between operating modes in a multimode engine is that simply maintaining the total fuel energy content constant during the transition period fails to take differences in combustion efficiency into account while air charge parameters remain unchanged. That is, (1) diesel fuel has a lower heating value and a lower stoichiometric air fuel ratio than gaseous fuel per unit fuel mass and, (2) combustion efficiency of pilot ignited gaseous fuel depends on excess air ratio of gas (gas lambda) and ignition timing. Simply increasing or decreasing gaseous fuel quantity may not achieve the desired effect because gas lambda may be outside of an optimal range for the selected gaseous fuel quantity. Existing airflow control devices are incapable of adjusting airflow to the cylinders rapidly enough to immediately obtain the optimum lambda for the selected quantity of the new fuel. As a result, the engine may still exhibit power surges and droops, even if total fuel energy content remains constant.

Another result of the typical dual fuel engine's inability to provide smooth transition between operating modes is that it must set a transition line between diesel mode and pilot ignited gaseous fuel mode at a higher speed than would otherwise be required at a given load, reducing the percentage of total operating range in which the engine is capable of operating in pilot ignited gaseous fuel mode.

The need therefore has arisen to provide a multimode engine that more assuredly provides a smooth transition between operating modes and reduces the frequency of switching between those modes when compared to prior multimode engines. Another need that has arisen, due at least in part to the inability of prior engines to adequately meet the objective for providing a smooth transition between operating modes in a multimode engine, is to adequately maximize the percentage of the engine operating range in which the engine operates in pilot ignited gaseous fuel mode.

SUMMARY OF THE INVENTION

In accordance with a preferred aspect of the invention, at least one engine operating parameter other than total fuel energy content is taken into account in order to maintain a smooth transition between modes of a multimode engine. The parameter preferably comprises at least one of primary fuel excess air ratio (lambda) and ignition timing, and preferably is controlled in addition to total fuel energy content control. Lambda control is especially beneficial because it permits the control system to compensate for the engine's inability to substantially alter the instantaneous air mass in the combustion chamber during the transition period. For instance, during a transition from diesel pilot ignited gaseous fuel mode to diesel mode, the controlled parameter preferably comprises diesel lambda, and the controlling operation comprises setting a target or desired diesel lambda at a relatively high value at the beginning of the transition period and thereafter reducing diesel lambda during the transition period. In this case, the controlling operation may comprise determining a gas lambda of the gaseous fuel, determining a diesel lambda limit, and adjusting diesel fuel delivery to be at or above the diesel lambda limit. The diesel lambda limit preferably is initially determined based on the prevailing gas lambda and then adjusted downwardly on a cycle-by-cycle basis to a final value that is at or near the diesel smoke limit. The magnitude of adjustment in each cycle is preferably speed and/or time dependent.

During a transition from the diesel mode to pilot ignited gaseous fuel mode, the controlling operation preferably comprises determining a gas lambda of the gaseous fuel, determining a gas lambda rich limit for prevailing engine operating conditions, comparing the determined gas lambda to the gas lambda rich limit, and making the transition from the diesel mode to pilot ignited gaseous fuel mode only if the determined gas lambda is at or above the determined gas lambda rich limit.

Other aspects and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications could be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

The mode switching concepts and transition controls described herein are applicable to a variety of multimode engines in which it is desirable to maintain engine torque and/or speed substantially constant when transitioning between operating modes. Hence, while a preferred embodiment of the invention will now be described in conjunction with a turbocharged, low pressure EGR, dual fuel engine, it is usable with tri-mode and other multimode engines as well.

Figure 1:
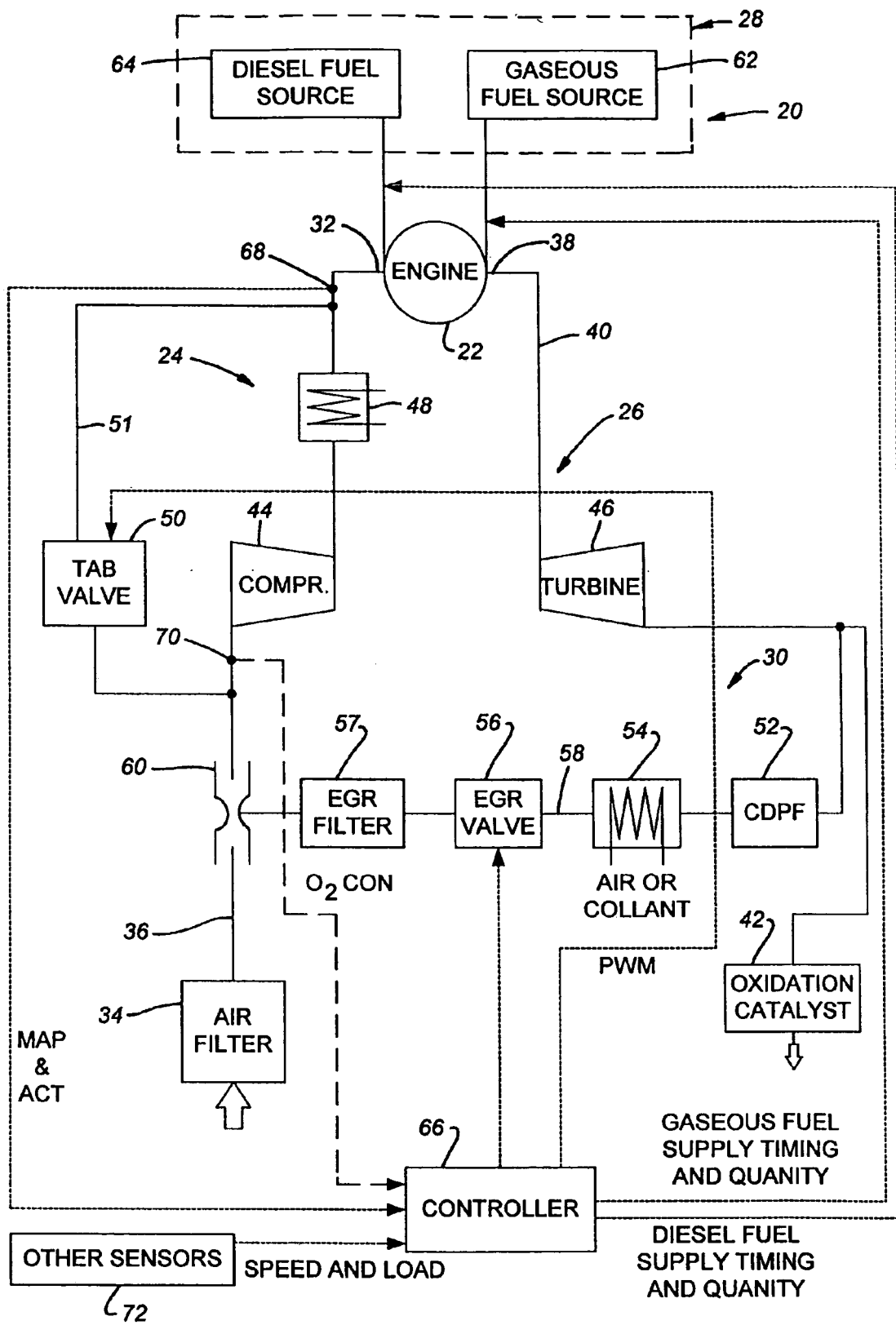
FIG. 1 schematically represents a dual fuel engine constructed and controlled in accordance with a preferred embodiment of the present invention.

Referring to FIG. 1, a dual fuel engine 20 to which the invention is applicable includes a number of cylinders 22 (only one of which is shown), an intake system 24 supplying an air/EGR combustion mixture to the cylinders 22, an exhaust system 26, a fueling system 28, an EGR system 30, and other components (not shown) commonly found on a compression ignition engine such as intake and exhaust valves. The intake system 24 comprises an air intake manifold 32 having a split outlet connected to the various cylinders 22 and an inlet connected to an air filter 34 by an intake passage 36. The exhaust system 26 comprises an exhaust manifold 38 having a split inlet coupled to the various cylinders and an outlet coupled to an exhaust passage 40 having an oxidation catalyst 42 thereon for catalytically reducing the exhaust gas before exhausting them to the atmosphere. The illustrated engine 20 is a turbocharged engine having a compressor 44 located in air intake passage 36 upstream of the intake manifold 32 and a turbine 46 located in the exhaust passage 40 downstream of the exhaust manifold 38. A controllable turbo air bypass (TAB) valve 50 is also provided in the air intake system 24 for further treating and/or controlling the flow of compressed air to the airflow intake manifold 32. The TAB valve 50 is located in a TAB line 51 bypassing the compressor 44.

The EGR system 30 of this embodiment is configured to recirculate a portion of the exhaust gases through an EGR line 58 having an inlet in fluid communication with an outlet of the turbine 46 and an outlet in fluid communication with the intake passage 36 upstream of the compressor 44. The EGR system 30 includes, from upstream to downstream end, a diesel particulate trap 52, an EGR cooler 54, an EGR valve 56, and an EGR filter 57, all located in the EGR line 58. The outlet of the EGR line 58 discharges into the EGR inlet of a venturi 60 that is disposed in the intake passage 36 upstream of the compressor inlet. The venturi 60 also has a fresh air inlet that receives ambient air from the air filter 34 and a mixture outlet that discharges the air/EGR mixture to the compressor inlet.

The fueling system 28 includes an electronically controllable gaseous fuel source 62 and a separately electronically controllable diesel fuel source 64. The gaseous fuel source 62 may be configured to supply gaseous fuel to each cylinder 22 of the engine 20 either in the form of a premixed charge or via high pressure direct injection (HPDI). If it is configured to supply a premixed charge, the gaseous fuel source 62 may comprise a tank that stores compressed natural gas (CNG) or liquefied natural gas (LNG), one or more shut off valves, and either a single metering valve discharging into a single throttle body at the entrance of the engine's air intake manifold 32 or a separate injector provided for each cylinder's supply passage or each cylinder's intake port. If it is configured for HPDI, the gaseous fuel supply source 62 will be configured to inject natural gas directly into each cylinder 22 using one or more dedicated high pressure injectors.

The diesel fuel source 64 may supply any liquid fuel capable of auto ignition in the traditional "diesel" cycle. It may comprise either a "single point" system that injects fuel from a single injector into the engine's air intake manifold 32 or a "multi point" system that injects fuel directly into each cylinder 22 or into each cylinder's air intake passage. In either case, the diesel injector(s) each comprise an electronically controlled injector supplied with diesel fuel or the like from a conventional tank and a supply line. Fuel is typically directed to the injector(s) from the tank via a filter, a pump, a high pressure relief valve, and a pressure regulator, none of which are shown.

A controller 66 is also provided for controlling operation of the fuel sources 62 and 64, the TAB valve 50, the EGR valve 56, and possibly other components of the engine. The controller 66 receives signals indicative of $O_2$ concentration in the intake mixture, intake mixture temperature or air charge temperature (ACT), intake mixture pressure or manifold absolute pressure (MAP), speed, load, and possibly additional data.

MAP is monitored by a sensor located in or near the intake manifold. The MAP sensor may be part of a block or module 68 that also measures ACT at the same location. $O_2$ concentration indicative data may be supplied by an $O_2$ concentration sensor 70 located in the intake passage 36 at the compressor inlet. Crank angle, speed, load, and any other data desired for combustion control is supplied via known sensors, collectively denoted 72 in FIG. 1.

The controller 66 can control the TAB valve 50, the EGR valve 56, and/or the fuel sources 62 and 64 based on the monitored and calculated parameters so as to optimize performance characteristics such as $NO_x$ reduction, HC reduction, and condensation prevention. The control preferably is implemented on a cylinder-by-cylinder, cycle-by-cycle basis.

Controller 66 also ascertains actual lambda, preferably on a cylinder-by-cylinder and cycle-by-cycle basis. Lambda may be ascertained mathematically from a calibrated fuel flow together with a determination of air flow using a speed density calculation using input from one or more of the sensors 68, 70, and 72 and/or may be measured somewhat more directly using a lambda sensor (not shown) in the exhaust stream.

The dual fuel engine 20 of this embodiment is also configured to switch between operating modes automatically with changes in speed and load conditions.

Figure 2:
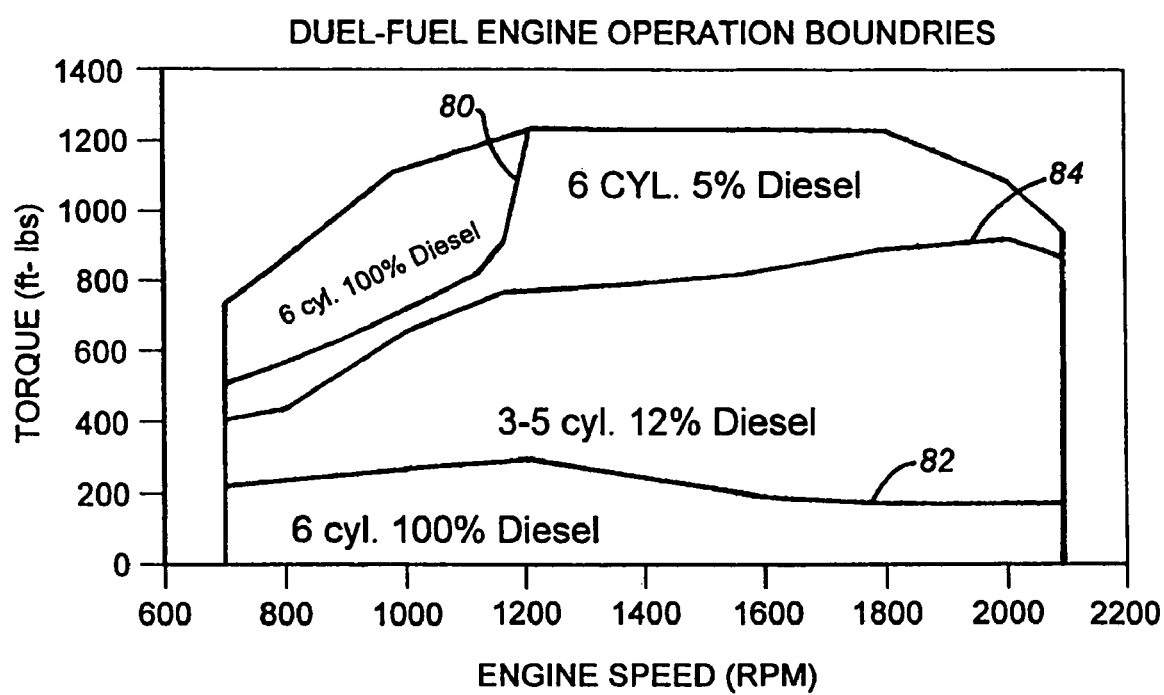
FIG. 2 is a map showing the transition between diesel only and gas modes in the engine of FIG. 1.

The engine 20 is preferably configured so as to operate in the pilot ignited gaseous fuel mode during as much of its speed/load range as practical. It is therefore desirable to have two speed-dependent transition points for a given vehicle load (at least at low speeds), with the engine being operated in pilot ignited gaseous fuel mode except under 1) low speed and high load conditions, and 2) light load and all speed conditions. Diesel operation is desired under low speed/high load conditions, as may be present when the engine speed lugs down when a loaded vehicle climbs a hill, because the engine's turbocharger may no longer be capable supplying sufficient turbo boost air at the reduced speed to produce an optimal pilot ignited premixed natural gas combustion at the desired relatively rich lambda of, e.g., 1.5. Diesel operation is also desired at low loads under all speed conditions in order to prevent lambda from exceeding the lean limit for premixed natural gas. The speed and load conditions under which transition between operating modes takes place may vary depending upon engine design. They will preferably be selected from a map stored in the controller 66. For instance, referring to FIG. 2, curves 80 and 82 illustrate the upper and lower transition lines over the entire speed/load range of a six cylinder engine to which the invention is applicable. Such an engine operates in pilot ignited gaseous fuel mode over most of its range, between curves 80 and 82 as indicated in FIG. 2. While operating in pilot ignited gaseous fuel mode, there will be some speed and load conditions under which the optimal gas lambda may not be achievable in an unthrottled engine. A skip fire strategy therefore is preferably employed to optimize lambda for the prevailing engine operations when the engine is operating in pilot ignited gaseous fuel mode. A suitable strategy for optimizing lambda through skip fire is disclosed in U.S. Pat. No. 5,553,575, the subject matter of which is hereby incorporated by reference. The speed/load range through which skip fire is employed in the illustrated embodiment is bordered by curves 84 and 82 in FIG. 2.

Conventional dual fuel engines do not adequately take the primary fuel lambda, i.e., gas lambda in pilot ignited gaseous fuel mode and diesel lambda in diesel mode, into account during transition. They therefore do not always achieve a smooth transition between operating modes. For instance, conventional dual fuel engines always operate the engine at a relatively high gas lambda (on the order of 1.8) in pilot ignited gaseous fuel mode and do not monitor the diesel lambda in diesel mode. Diesel lambda may be reduced immediately to approximately the diesel smoke limit (typically on the order of lambda 1.3) upon transitioning to diesel only mode. However, as described in more detail in the Background section above, the heightened power and decrease in commanded fuel at the relatively low diesel lambda could result in a premature or undesired switching back to pilot ignited gaseous fuel mode. In order to overcome or avoid these problems, diesel lambda preferably is taken into account during this transition period by controlling fuel delivery to set the diesel lambda at a relatively high value at the beginning of the transition period and thereafter reduce diesel lambda incrementally during the transition period until it reaches a level that is at or slightly above the diesel smoke limit. The initial diesel lambda value at the beginning of the transition period and rate of diesel lambda decrease preferably are set and maintained by maintaining the actual diesel lambda to be at or above a diesel lambda limit, $\lambda_{diesel-limit}$. The $\lambda_{diesel-limit}$, in turn, is in it at dependent at least in part upon the existing gas lambda, $\lambda_{gas}$ and is thereafter reduced during the remaining of the transition period. A preferred technique for determining $\lambda_{diesel-limit}$ at the beginning of the transition period and for controlling engine operation based on $\lambda_{diesel-limit}$ will be now be described.

Initially, during transition from pilot ignited gaseous fuel mode, the mass of diesel pilot fuel required to maintain a constant total fuel energy content can be determined on an equivalent total energy basis as follows:

$$HVR = \frac{LVH_{diesel}}{LHV_{DF}} = \frac{LHV_{diesel}}{x(LHV_{diesel}) + (1-x)(LHV_{gas})} \quad (1)$$

where
HVR is the mass ratio of diesel fuel to dual fuel on equivalent total fuel energy basis,
$LHV_{diesel}$=the lower heating value for diesel fuel,
$LHV_{gas}$=the lower heating value for gaseous fuel, and
x=the pilot diesel mass fraction.

Under these conditions:

$$Q_{diesel-equ} = HVR \times Q_{DF} \quad (2)$$

where:
$Q_{DF}$ is the total mass of diesel and gaseous fuel, and
$Q_{diesel-equ}$ is the mass of diesel fuel equivalent.

When standard diesel fuel is used in diesel mode and natural gas is used as the gaseous fuel in pilot ignited gaseous fuel mode:
$LHV_{diesel}$=18272 Btu/lb,
$LHV_{gas}$=20440 Btu/lb,
Pilot %=0.10,
$LHV_{DF}$=0.1×18272+0.9×20440=20223 Btu/lb, and
HVR=0.9035, then:

$$Q_{diesel-gas} = 0.9035 \times Q_{DF} \quad (3)$$

$\lambda_{diesel-limit}$ can now be determined as a function of the $\lambda_{gas}$ using the following equations:

$$\lambda_{gas} = \frac{Mass_{air} - x(Q_{DF})(SAFR_{diesel})}{(1-x)(SAFR_{gas})(Q_{DF})} \quad (4)$$

Hence:

$$Mass_{air} = x(Q_{DF})(SAFR_{diesel}) + \lambda_{gas}(1-x)(SAFR_{gas})(Q_{DF}) \quad (5)$$

where:
$Mass_{air}$ is the mass of the air charge,
$SAFR_{diesel}$ is the stoichiometric air-fuel ratio of diesel fuel, and $SAFR_{gas}$ is the stoichiometric air-fuel ratio of gaseous fuel.

At the instant of transition from dual fuel to diesel operating modes, the air mass remains constant. $\lambda_{diesel\text{-}limit}$ can therefore be determined as below, based on equivalent air mass and total fuel energy.

$$\lambda_{diesel\text{-}limit} = \frac{Mass_{air}}{(Q_{diesel\text{-}equ})(SAFR_{diesel})} \qquad (6)$$

$$= \frac{x(Q_{DF})(SAFR_{diesel}) + \lambda_{gas}(1-x)(SAFR_{gas})(Q_{DF})}{Q_{DF}(HVR)(SAFR_{diesel})}$$

Using the parameters described above, Equation (6) reduces to:

$$\lambda_{diesel\text{-}limit} = \frac{x(SAFR_{diesel}) + \lambda_{gas}(SAFR_{gas})}{HVR(SAFR_{diesel})} \qquad (7)$$

When
$SAFR_{diesel}$=Stoichiometric air fuel ratio of diesel=14.5,
$SAFR_{gas}$=Stoichiometric air fuel ratio of natural gas=16.0,
HVR=0.9035, and
x=0.1.

$$\lambda_{diesel\text{-}limit} = \frac{0.1 \times 14.5 + 16 \times \lambda_{gas}}{0.9035 \times 14.5} = 0.11 + 1.22(\lambda_{gas}) \qquad (8)$$

Figure 3:
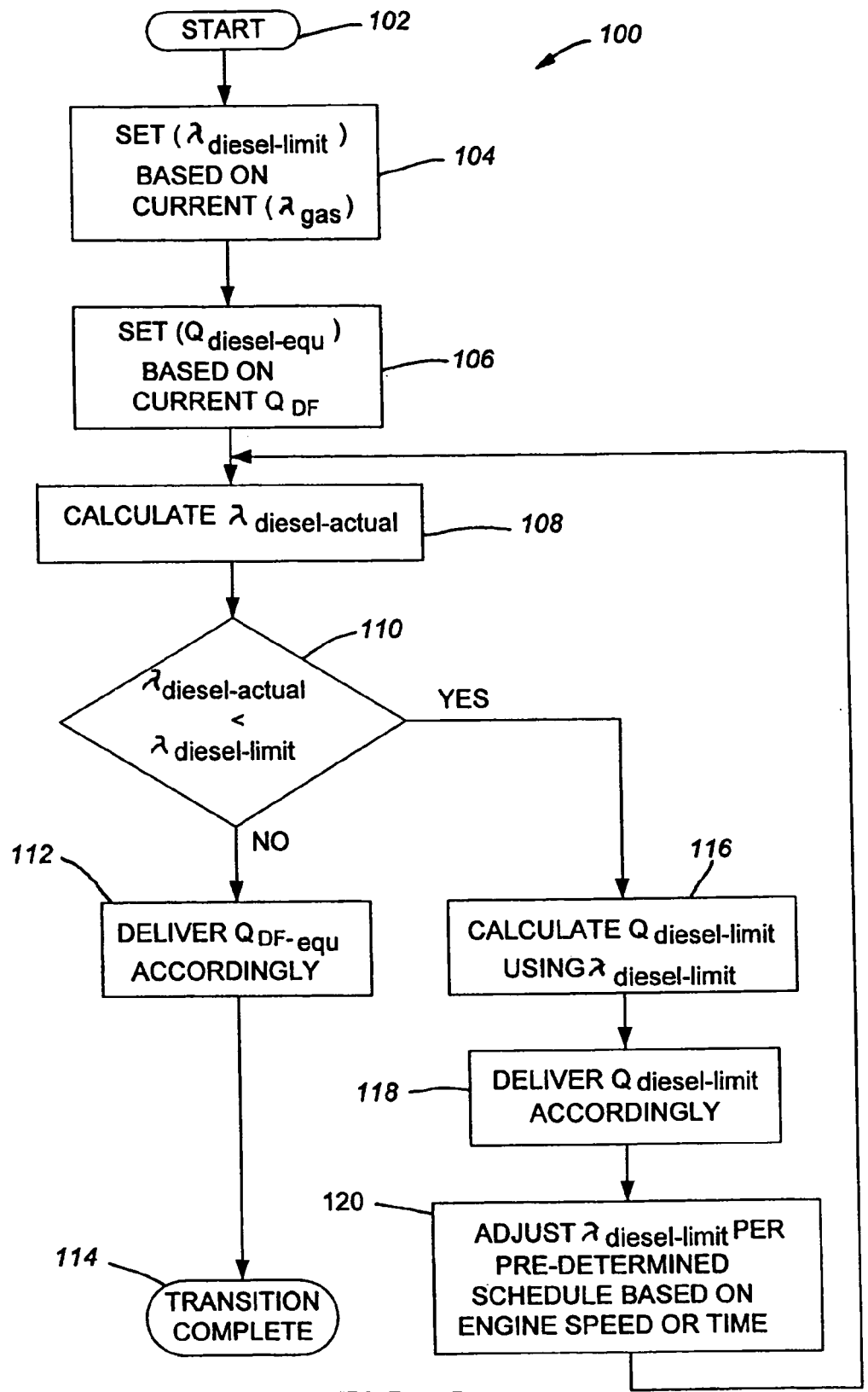
FIGS. 3 and 4 are flowcharts illustrating a preferred computer implemented technique for transitioning between operating modes in the engine of FIG. 1.

A preferred technique for controlling engine operation based on the $\lambda_{diesel\text{-}limit}$ prevailing at the beginning of the transition period is illustrated in FIG. 3. The technique is implemented via a routine programmed into the controller 66. The routine 100 proceeds from Start in Block 102 to Block 104, where it determines $\lambda_{gas}$ either directly from a sensor or indirectly from other measured values as described above. It sets the $\lambda_{diesel\text{-}limit}$ for the prevailing $\lambda_{gas}$, preferably using Equation (8) above. It then proceeds to Block 106 and sets $Q_{diesel\text{-}equ}$ for the prevailing total fuel quantity ($Q_{DF}$) using Equation (2) above. Then, in Block 108, the routine 100 calculates the actual $\lambda_{diesel}$, either directly or indirectly from the known $Q_{diesel}$ and $Q_{air}$. The routine 100 then proceeds to Block 110 and determines whether $\lambda_{diesel}$ is less than $\lambda_{diesel\text{-}limit}$. If not, the routine 100 proceeds to Block 112, where the controller 66 controls the diesel fuel source 64 to deliver the commanded fuel quantity $Q_{diesel\text{-}equ}$, at which point transition is considered to be complete, and the routine 100 ends in Block 114.

If, on the other hand, the answer to the inquiry of Block 110 is YES, indicating that the transition period is not yet complete, $Q_{diesel\text{-}limit}$ is calculated in Block 116 using the prevailing $\lambda_{diesel\text{-}limit}$, and the diesel fuel source 64 is controlled in Block 118 to deliver the determined diesel quantity $Q_{diesel\text{-}limit}$.

Then, in Block 120, the routine 100 adjusts $\lambda_{diesel\text{-}limit}$ downwardly from the initial, relatively high value (typically about 2.0), toward the diesel smoke limit (typically about 1.3) pursuant to a predetermined schedule. The predetermined schedule may be engine speed dependent and/or time dependent. It is preferably engine speed dependent to allow for more diesel fuel delivery when the engine speed is being pulled down by a heavy load, with a resulting decrease in turbo speed and associated decrease in the available air quantity.

The routine 100 then returns to Block 108 to update the current diesel lambda and continues to Block 110 to determine that $\lambda_{diesel\text{-}actual}$ exceeds $\lambda_{diesel\text{-}limit}$, in which case the routine for 100 proceeds through Blocks 112 and 114 to complete the transition.

As indicated above, it is also desirable to keep the transition line (curve 80 shown in FIG. 2) between diesel mode and the pilot ignited gaseous fuel mode at the highest practical load level for a given speed and to permit the engine to switch to pilot ignited natural gaseous fuel mode as soon as feasible as speed increases under heavy load. This goal can be achieved by introducing a gas lambda rich limit and by controlling engine operation to stay in diesel mode only when $\lambda_{gas\text{-}actual}$ exceeds a lambda gas $\lambda_{gas\text{-}rich\text{-}limit}$. Specifically:

When transitioning from diesel to dual fuel mode, $\lambda_{gas\text{-}equ}$ can be derived from Equation (7) and calculated by:

$$\lambda_{gas\text{-}equ} = \frac{\lambda_{diesel}(HVR)(SAFR_{diesel}) - x(SAFR_{diesel})}{SAFR_{gas}} \qquad (9)$$

$$= (HVR)(\lambda_{diesel} - x)\frac{SAFR_{diesel}}{SAFR_{gas}}$$

When the current $\lambda_{diesel}$ is 2.0 in diesel mode, $\lambda_{gas\text{-}equ}$ will be 1.556 in pilot ignited gaseous fuel mode at transition.

Hence:

$$Q_{DF\text{-}equ} = \frac{Q_{diesel}}{HVR} \qquad (10)$$

Figure 4:
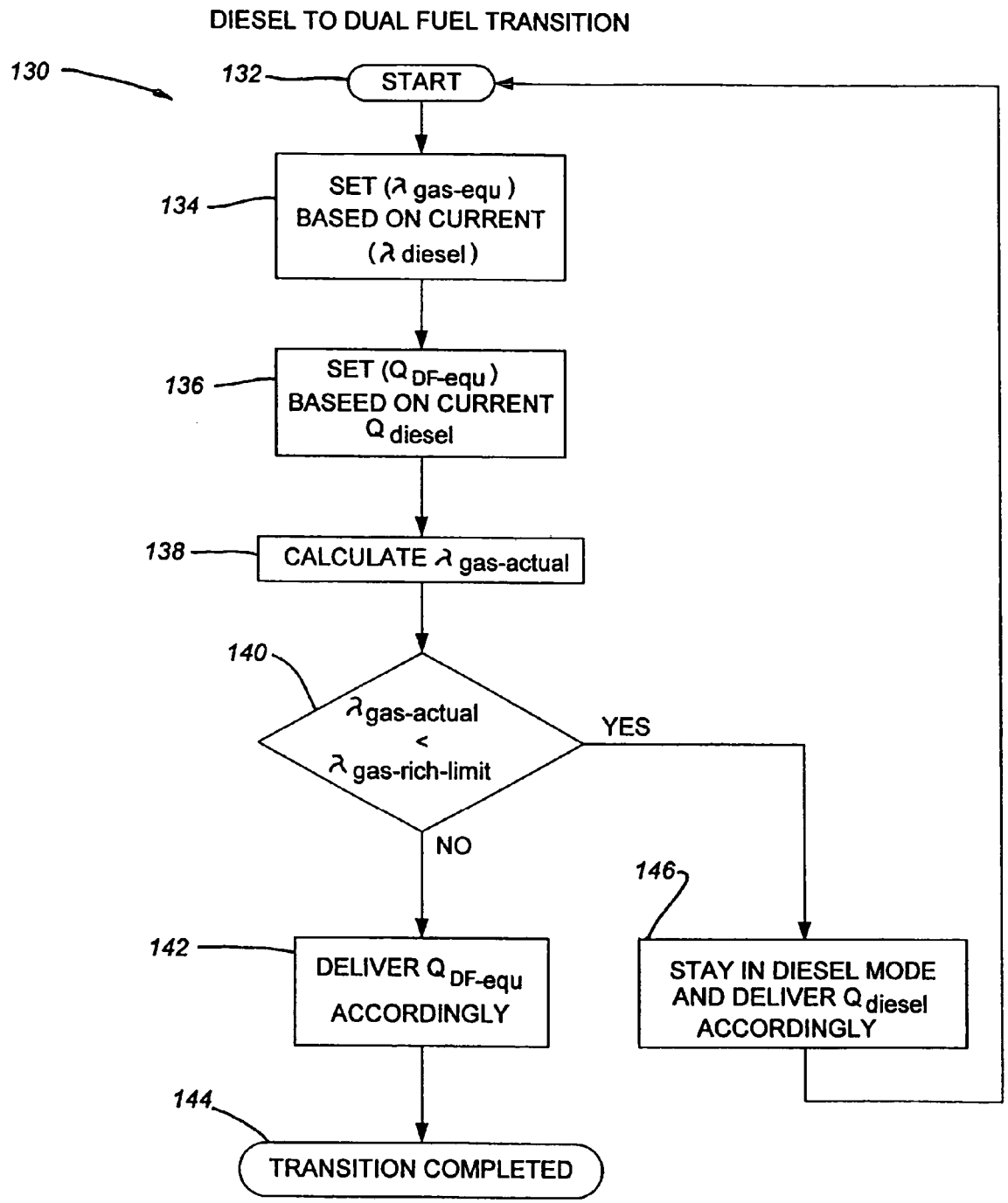

The preferred technique for this control is illustrated in FIG. 4, which illustrates a routine 130 that once again is implemented via a program in the controller 66. The routine 130 proceeds from Start in Block 132 to Block 134 where the prevailing $\lambda_{diesel}$ is determined and the $\lambda_{gas\text{-}equ}$ is then determined, preferable using Equation (9) above. Then, in Block 136, $Q_{DF\text{-}equ}$ is set based on the current $Q_{diesel}$, preferably using Equation (10) above. $\lambda_{gas\text{-}actual}$ is then calculated in Block 138, preferably using Equation (4) above. Then, in Block 140, the routine 130 determines whether $\lambda_{gas\text{-}actual}$ is less than a $\lambda_{gas\text{-}rich\text{-}limit}$, which is the lowest gas lambda that is acceptable for achieving the desired operating characteristic. For instance, $\lambda_{gas}$ is usually maintained at a value of approximately 1.8. However, at low engine speeds, the turbocharger may not be capable of providing a $\lambda_{gas}$ of 1.8. If $\lambda_{gas}$ drops below an engine dependent minimum value, $\lambda_{gas\text{-}rich\text{-}limit}$, the engine may knock. $\lambda_{gas\text{-}rich\text{-}limit}$ will typically be about 1.5 and is determined empirically based on the prevailing manifold absolute pressure, (MAP), air charge temperature (ACT), and other parameters, if desired. Switching over to diesel mode when $\lambda_{gas\text{-}actual}$ drops below $\lambda_{gas\text{-}rich\text{-}limit}$ will prevent engine from knocking.

If the answer to the inquiry of Block 140 is NO, the routine 130 delivers natural gas and pilot fuel in the amount required to obtain the desired total energy fuel content in Block 142, at which point the transition period is considered complete and the routine 130 ends in Block 144. However, if the answer to the inquiry of Block 140 is YES, indicating, e.g., that engine knock is imminent, the engine 20 stays in diesel mode, and the controller 66 controls the diesel fuel source 64 in Block 146 to deliver the diesel fuel quantity $Q_{diesel}$ required to obtain the desired total fuel energy content. The routine 130 then returns to Block 132, and Blocks 134, 136, 138, 140, and 146 are repeated on a cycle-by-cycle basis for the duration of the transition period.

Other engine characteristics could also be controlled during the transition period. For instance, diesel pilot injection timing may be controlled in addition to lambda control. Most engine control system employs two separate diesel injection timing maps, one for diesel mode and the other for pilot ignited gaseous fuel mode. During the transition period, the diesel injection timing often will shift as a new map is selected. These shifts may be dramatic, leading to a noticeable and rapid change in engine performance. The transition can be smoothed by adjusting diesel injection timing incrementally over a number of operating cycles rather than all at once. The size of each increment "I" may vary with designer preference and a particular engine's sensitivity to changes in ignition timing under the prevailing operating conditions. Pilot diesel injection timing may also be adjusted during the transition from diesel mode to pilot ignited gaseous fuel mode for maintaining constant engine torque. The adjustment of pilot diesel injection timing from the nominal injection timing map is preferably determined empirically based on the actual gas lambda.

To the extent that they might not be apparent from the above, the scope of variations falling within the scope of the present invention will become apparent from the appended claims.

I claim:

1. A method comprising:
   (A) operating an internal combustion engine in a first mode comprising one of a diesel mode and a pilot ignited gaseous fuel mode; then
   (B) operating said internal combustion engine in a second mode comprising the other of said diesel mode and said pilot ignited gaseous fuel mode; and
   (C) during a transition period between said first and second modes, controlling engine operation based on at least one engine operating parameter other than total energy fuel content to achieve an at least substantially smooth transition between operating modes, wherein the controlled engine operating parameter includes at least one of lambda and diesel fuel injection timing.

2. The method as recited in claim 1, wherein the at least substantially smooth transition is achieved by maintaining total engine torque at least substantially constant during the transition period.

3. The method as recited in claim 1, wherein the transition is from pilot ignited gaseous fuel mode to diesel mode, the controlled engine operating parameter comprises diesel lambda, and the controlling step comprises controlling diesel lambda to be at a relatively high value at the beginning of the transition period and thereafter progressively reducing diesel lambda during the transition period.

4. The method as recited in claim 3, wherein the controlling step comprises
   determining the actual gas lambda of the gaseous fuel at the beginning of the transition period,
   determining a diesel lambda limit at the beginning of the transition period, and
   adjusting diesel fuel delivery so as to maintain the actual diesel lambda at or above the diesel lambda limit.

5. The method as recited in claim 4, wherein the diesel lambda limit at the beginning of the transition period is determined by multiplying the determined actual gas lambda at the beginning of the transition period by a multiplying factor.

6. The method as recited in claim 5, wherein the step of determining the diesel lambda limit at the beginning of the transition period comprises solving the following equation:

$$\lambda_{diesel\text{-}limit} = \frac{x(SAFR_{diesel}) + \lambda_{gas}(SAFR_{gas})}{HVR(SAFR_{diesel})}$$

where:
   x=the prevailing pilot diesel mass fraction,
   $SAFR_{diesel}$=the stoichiometric air-fuel ratio for the diesel fuel,
   $\lambda_{gas}$=the determined actual gas lambda at the beginning of the transition period,
   $SAFR_{gas}$=the stoichiometric air-fuel ratio for the gaseous fuel, and
   HVR=the prevailing mass ratio of the diesel fuel to the total fuel charge on an equivalent total fuel energy basis.

7. The method as recited in claim 4, further comprising, during the transition period, reducing the diesel lambda limit from the determined value at the beginning of the transition period to a final value that is at or near the diesel smoke limit.

8. The method as recited in claim 7, wherein the reducing step comprises incrementally reducing the diesel lambda limit using a predetermined schedule that is dependent on at least one of engine speed and time.

9. The method as recited in claim 3, wherein the transition is from diesel mode to pilot ignited gaseous fuel mode, and wherein the controlling step comprises
   determining the actual gas lambda of the gaseous fuel at the beginning of the transition period,
   determining a gas lambda-rich limit for prevailing engine operating conditions,
   comparing the determined actual gas lambda to the gas lambda-rich limit, and
   operating the engine in diesel mode if the determined gas lambda is less than the determined gas lambda-rich limit.

10. The method as recited in claim 9, further comprising determining the gas lambda-rich limit based at least in part on at least one of manifold absolute pressure and air charge temperature.

11. The method as recited in claim 1, wherein the controlled engine operating parameter is ignition timing.

12. The method as recited in claim 11, wherein the controlling step comprises
   selecting a desired ignition timing for the second mode, the desired ignition timing for the second mode being different than the existing ignition timing for the first mode, and
   adjusting ignition timing incrementally over a plurality of engine operating cycles until the actual ignition timing at least approximately equals the desired ignition timing.

13. The method as recited in claim 1, wherein said engine is a dual fuel engine capable of operating only in the diesel mode and the pilot ignited gaseous fuel mode.

14. The method as recited in claim 1, further comprising controlling fuel supply to maintain total fuel energy content at least substantially constant during the transition period.

15. A method comprising:
(A) operating a dual fuel internal combustion engine in a first mode comprising one of a diesel mode and a pilot ignited gaseous fuel mode; then
(B) operating said internal combustion engine in a second mode comprising the other of said diesel mode and said pilot ignited gaseous fuel mode; and
(C) during a transition period between said first and second modes, controlling engine operation based on multiple engine parameters including lambda to achieve an at least substantially smooth transition between operating modes by maintaining total engine torque at least substantially constant.

16. The method as recited in claim 15, wherein the transition is from pilot ignited gaseous fuel mode to diesel mode, a controlled engine operating parameter comprises diesel lambda, and the controlling step comprises controlling diesel lambda to be at a relatively high value at the beginning of the transition period and thereafter reducing diesel lambda toward a smoke limit by the end of the transition period.

17. The method as recited in claim 16, further comprising determining a diesel lambda limit at the beginning of the transition period using the following equation:

$$\lambda_{diesel\text{-}limit} = \frac{x(SAFR_{diesel}) + \lambda_{gas}(SAFR_{gas})}{HVR(SAFR_{diesel})}$$

where:
x=the prevailing diesel fuel mass fraction,
$SAFR_{diesel}$=the stoichiometric air-fuel ratio for the diesel fuel,
$\lambda_{gas}$=the determined actual gas lambda at the beginning of the transition period,
$SAFR_{gas}$=the stoichiometric air-fuel ratio for the gaseous fuel, and
HVR=the prevailing mass ratio of the diesel fuel to the total fuel charge on an equivalent total fuel energy basis.

18. The method as recited in claim 15, wherein the transition is from diesel mode to pilot ignited gaseous fuel mode, a controlled engine operating parameter comprises gas lambda, and the controlling step comprises:
determining the actual gas lambda of the gaseous fuel at the beginning of the transition period,
determining a gas lambda-rich limit for prevailing engine operating conditions,
comparing the determined gas lambda to the gas lambda-rich limit, and
operating the engine in diesel mode if the determined gas lambda is less than the
determined gas lambda-rich limit.

19. An internal combustion engine comprising:
(A) at least one cylinder;
(B) a source of diesel fuel configured to supply a liquid fuel to said cylinder;
(C) a source of a gaseous fuel configured to supply a gaseous fuel to said cylinder; and
(D) a controller that is coupled to said diesel fuel source and said gaseous fuel source and that controls said sources to selectively
(1) supply fuel to said engine in a first mode comprising one of a diesel mode and a pilot ignited gaseous fuel mode, then
(2) supply fuel to said engine in a second mode comprising the other of said diesel mode and said pilot ignited gaseous fuel mode, and
(3) during a transition period between said first and second modes, control engine operation based on at least one engine operating parameter other than total energy fuel content to achieve an at least substantially smooth transition between operating modes, wherein the controlled engine operating parameter includes at least one of lambda and liquid fuel injection timing.

20. The engine as recited in claim 19, wherein, during a transition from pilot ignited gaseous fuel mode to diesel mode, the controlled engine operating parameter comprises diesel lambda, and the controller is operable to set diesel lambda at a relatively high value at the beginning of the transition period and thereafter reduce diesel lambda during the transition period.

21. The engine as recited in claim 20, wherein, during the transition from pilot ignited gaseous fuel mode to diesel mode, the controller is operable to
determine the actual gas lambda of the gaseous fuel at the beginning of the transition period,
determine a diesel lambda limit, and
adjust diesel fuel delivery to maintain the actual diesel lambda at or above the diesel lambda limit.

22. The engine as recited in claim 21, wherein, at the beginning of the transition period, the controller is operable to determine the diesel lambda limit by multiplying the determined actual gas lambda by a multiplying factor.

23. The engine as recited in claim 21, wherein the controller is further operable, during the transition from pilot ignited gaseous fuel mode to diesel mode, to reduce the diesel lambda limit from the determined value at the beginning of the transition period to a final value that is at or near the diesel smoke limit.

24. The engine as recited in claim 23, wherein the controller is operable to reduce the determined diesel lambda limit using a predetermined schedule that is dependent on at least one of engine speed and time.

25. The engine as recited in claim 21, wherein the controller is operable to determine the diesel lambda limit at the beginning of the transition period by solving the following equation for the determined gas lambda:

$$\lambda_{diesel\text{-}limit} = \frac{x(SAFR_{diesel}) + \lambda_{gas}(SAFR_{gas})}{HVR(SAFR_{diesel})}$$

where:
x=the prevailing diesel fuel mass fraction,
$SAFR_{diesel}$=the stoichiometric air-fuel ratio for the diesel fuel,
$\lambda_{gas}$=the determined gas lambda at the beginning of the transition period,
$SAFR_{gas}$=the stoichiometric air-fuel ratio for the gaseous fuel, and
HVR=the prevailing mass ratio of the liquid fuel to the total fuel charge on an equivalent total fuel energy basis.

26. The engine as recited in claim 19, wherein, during a transition from diesel mode to pilot ignited gaseous fuel mode, the controller is operable to determine the actual gas lambda of the gaseous fuel at the beginning of the transition period, determine a gas lambda-rich limit for prevailing engine operating conditions, compare the determined actual gas lambda to the gas lambda limit, and operate the engine in diesel mode if the determined gas lambda is less than the determined gas lambda-rich limit.

27. The engine as recited in claim 26, wherein the controller is operable to determine the gas lambda-rich limit based at least in part on at least one of manifold absolute pressure and air charge temperature.

28. The engine as recited in claim 19, wherein, during the transition period, the controller is operable to select a desired ignition timing for the second mode, the desired ignition timing for the second mode being different than the existing ignition timing for the first mode, adjust ignition timing incrementally over a plurality of engine operating cycles until the actual ignition timing at least approximately equals the desired ignition timing.

29. The engine as recited in claim 19, wherein the engine is a dual fuel engine capable of operating only in the diesel mode and the pilot ignited gaseous fuel mode.

30. The engine as recited in claim 19, wherein the controller is further operable to control fuel supply to maintain total fuel energy at least substantially constant during the transition period.

31. A method comprising:
(A) operating a dual fuel internal combustion engine in a first mode comprising one of a diesel mode and a pilot ignited gaseous fuel mode; then
(B) operating the internal combustion engine in a second mode comprising the other of the diesel mode and the pilot ignited gaseous fuel mode; and
(C) during a transition period between said first and second modes, substantially maintaining engine torque by operating the engine in a combined diesel and pilot ignited gaseous fuel mode, where the volumes of delivered diesel fuel and gaseous fuel are determined based on
(i) a determined gas lambda of the gaseous fuel; and
(ii) a diesel lambda limit value which is determined based at least in part on the magnitude of the gas lambda of the gaseous fuel, wherein the diesel lambda is adjusted during the transition period based at least in part based on the gas lambda of the gaseous fuel, and the magnitude of a manifold absolute pressure value.

* * * * *